US006613369B2

(12) United States Patent
Gaebler et al.

(10) Patent No.: US 6,613,369 B2
(45) Date of Patent: Sep. 2, 2003

(54) VEGETABLE SAUSAGE ANALOGUES

(75) Inventors: David M. Gaebler, Sun Prairie, WI (US); Julie A. Simonson, Sun Prairie, WI (US)

(73) Assignee: Kraft Foods Holdings, Inc., Northfield, IL (US)

( * ) Notice: Subject to any disclaimer, the term of this patent is extended or adjusted under 35 U.S.C. 154(b) by 337 days.

(21) Appl. No.: 09/820,455

(22) Filed: Mar. 29, 2001

(65) Prior Publication Data

US 2002/0142086 A1 Oct. 3, 2002

(51) Int. Cl.[7] .............. A23J 1/14; A23J 3/14; A23J 3/16; A23J 3/22
(52) U.S. Cl. .......... 426/93; 426/574; 426/578; 426/656; 426/512; 426/802
(58) Field of Search .......... 426/93, 574, 578, 426/656, 661, 138, 512, 802

(56) References Cited

U.S. PATENT DOCUMENTS

| | | | |
|---|---|---|---|
| 3,498,794 A | | 3/1970 | Calvert et al. |
| 3,794,731 A | | 2/1974 | Dannert et al. |
| 3,919,435 A | | 11/1975 | Feldbrugge et al. |
| 3,922,352 A | | 11/1975 | Tewey et al. |
| 4,089,981 A | | 5/1978 | Richardson |
| 4,125,630 A | * | 11/1978 | Orthoefer .......... 426/104 |
| 4,178,394 A | | 12/1979 | Kumar |
| 4,276,319 A | * | 6/1981 | Nguyen et al. .......... 426/574 |
| 4,287,219 A | | 9/1981 | Fabre |
| 4,303,682 A | | 12/1981 | Guitteny et al. |
| 4,369,195 A | | 1/1983 | Nelson et al. |
| 4,510,166 A | | 4/1985 | Lenchin et al. |
| 4,556,570 A | | 12/1985 | Brander et al. |
| 4,563,360 A | | 1/1986 | Soucie et al. |
| 4,755,393 A | | 7/1988 | Toba et al. |
| 4,818,558 A | | 4/1989 | Hartman et al. |
| 4,844,922 A | | 7/1989 | Uemura et al. |
| 4,853,238 A | | 8/1989 | Huang |
| 4,863,749 A | | 9/1989 | Yamada |
| 4,897,280 A | | 1/1990 | Ohtsu |
| 4,943,441 A | * | 7/1990 | McCabe .......... 426/511 |
| 5,068,117 A | * | 11/1991 | McCabe .......... 426/511 |
| 5,100,688 A | | 3/1992 | Cox et al. |
| 5,110,612 A | | 5/1992 | Quarles et al. |
| 5,160,758 A | | 11/1992 | Parks et al. |
| 5,183,683 A | | 2/1993 | Mott et al. |
| 5,225,233 A | | 7/1993 | Komatsu et al. |
| 5,279,844 A | | 1/1994 | Wesdorp et al. |
| 5,294,456 A | | 3/1994 | Jenkins et al. |
| 5,368,878 A | | 11/1994 | Smick et al. |
| 5,433,969 A | | 7/1995 | McMindes et al. |
| 5,472,729 A | | 12/1995 | Larsson |
| 5,472,731 A | | 12/1995 | Fuisz |
| 5,571,545 A | | 11/1996 | Yokoyama et al. |
| 5,603,976 A | | 2/1997 | Share et al. |
| 5,626,899 A | | 5/1997 | Payne et al. |
| 5,654,028 A | | 8/1997 | Christensen et al. |
| 5,676,987 A | | 10/1997 | Lai |
| 5,804,246 A | | 9/1998 | Peck et al. |
| 5,858,442 A | | 1/1999 | Payne et al. |
| 5,895,677 A | | 4/1999 | Lai |
| 6,140,469 A | | 10/2000 | Shen et al. |

* cited by examiner

*Primary Examiner*—Nina Bhat
(74) *Attorney, Agent, or Firm*—Cook, Alex, McFarron, Manzo, Cummings & Mehler, Ltd.

(57) ABSTRACT

Vegetable sausage analogues are provided which have texture and flavor delivery components dispersed within a set-up matrix formed from a composition including powdered vegetable protein. Included is a structured filamentous protein component which mimics connective tissue proteins of meat products. Other components can include thermally preformed textured proteinaceous gel phase components to mimic particles of meat protein. Further includable components are thermally structured starch carbohydrate gel crumble components which enhance flavor delivery when the sausage product is chewed.

23 Claims, No Drawings

VEGETABLE SAUSAGE ANALOGUES

FIELD OF THE INVENTION

This invention generally relates to sausage analogues which need not include any meat in order to achieve texture and flavor delivery which enhances the acceptability of the cooked sausage analogues to the consumer. Vegetable components are prepared and combined in a manner which achieves such advantageous results while receiving the benefit of vegetable components, particularly health benefits.

BACKGROUND OF THE INVENTION

Sausage analogues containing no meat or substantially reduced levels of meat are well known. Brander et al U.S. Pat. No. 4,556,570 describes a sausage meat analogue which is designed to approximate the juiciness and tenderness properties of an all-meat product. Jenkins et al U.S. Pat. No. 5,294,456 describes food compositions having a fat mimic which is composed of a cereal hydrolysate and a hydrocolloide gum. Both of these patents incorporate a gum into a sausage or other food composition. While gums are widely used and accepted in a variety of food products, including vegetable based products, it also is desirable to avoid having a gum ingredient within these types of food products. In addition, these earlier approaches do not consistently provide a texture and flavor delivery system which provides products having highly desirable taste attributes.

Other approaches incorporate low levels of meat within vegetable-based foods. These include Smick et al U.S. Pat. No. 5,368,878, Share et al U.S. Pat. No. 5,603,976, Christensen et al U.S. Pat. No. 5,654,028 and Lai U.S. Pat. No. 5,895,677. Also in this general category is Lai U.S. Pat. No. 5,676,987; this relates to low-fat meat analogue food products which include substantial quantities of plant protein, meat analogue and thermo-irreversible starch gel which has a texture that mimics adipose tissue. The thermo-irreversible starch gel is ground to a very fine particle size. This gel texture which mimics adipose tissue texture is "non-liquid, smooth, springy, somewhat slippery and chewy at warm temperatures." The fine grinding taught by this patent has been found to be unsatisfactory in producing sausage products according to the invention. In addition, the springy and slippery adipose tissue texture is inconsistent with a desirable attribute of providing a flavor delivery system which relies upon liquid release in order to distribute flavor during consumption.

A typical shortcoming of vegetable sausage analogues is the absence of suitable texture components. Especially absent in this regard has been a satisfactory manner of providing structured fibrous texture to a sausage analogue product. Non-analogue meat sausages include small "threads" of connective tissue proteins. Typically, these are visible as a sausage begins to break and typically are literally visible when a sausage is broken in two by hand. Such connective tissue protein threads contribute in part to the texture of meat sausage. Providing this type of texture without incorporating meat-originating connective tissue protein would be beneficial to sausage analogues.

SUMMARY OF THE INVENTION

In accordance with the present invention, sausage analogue products are provided and prepared which avoid the shortcomings of prior meatless or low meat sausage analogues. Included is a continuous phase binder matrix formed largely from powdered vegetable protein and water, typically in combination with an egg component or similar edible binder. This matrix also can incorporate at least a portion of structured filamentous protein component when present. The matrix provides the basic structure of the sausage product and supports vegetable components dispersed within the continuous phase binder matrix. These can be said to be discontinuously dispersed within the binder matrix. Such components include one or more of the structured filamentous protein component, a thermally preformed textured protein component, and a thermally structured carbohydrate gel crumble component. In a typical sausage analogue product, a desired amount of each of these three vegetable components is suitably prepared and added into the powered vegetable protein, water and edible binder. The resulting batter is stuffed into a form-defining element such as a casing. This is followed by heat processing of the batter until it achieves an internal temperature of at least about 185° F. (85° C.). Cooling leaves a formed sausage analogue.

It is accordingly a general object of the present invention to provide a vegetable sausage analogue having an enhanced texture and flavor delivery system.

Another object of the present invention is to provide an improved product and process relating to vegetable sausage analogues which incorporate structured filamentous protein domains.

Another object of this invention is to provide a process of providing vegetable sausage analogues which includes stuffing and heating a vegetable-based batter to provide a cohesive sausage product which exhibits an especially advantageous texture and flavor delivery system.

Another object of the present invention is to provide an improved product and process relating to vegetable sausages which includes a thermally preformed textured protein component which provides resistance to chew and contributes to a meat-like texture.

Another object of the present invention is to provide an improved product and process for analogue vegetable sausages having a thermally structured carbohydrate gel crumble having a grind size of on the order of one quarter inch.

Another object of the present invention is to provide an improved vegetable sausage analogue which incorporates at least two different vegetable protein domains, one imparting a fibrous texture, and another enhancing liquid flow and flavor release.

These and other objects, features and advantages of the present invention will be apparent from and clearly understood through a consideration of the following detailed description.

DESCRIPTION OF THE PREFERRED EMBODIMENTS

Products according to the invention have a continuous phase with vegetable protein component domains distributed within the continuous phase in order to enhance texture and flavor delivery. When heated, a matrix is formed with the result that the vegetable protein component domains are supported by and dispersed within the matrix.

With more particular reference to the materials from which the continuous phase binder matrix is formed, this is a proteinaceous continuous phase. Its components are substantially vegetable. A primary component is a powdered vegetable protein, together with water. An edible binder often is desirable in order to enhance cohesiveness. Including a vegetable oil within this formulation has been found to be useful. Wheat gluten, such as vital wheat gluten, likewise can be included for enhancing the continuous phase binder matrix.

This continues phase itself will form into a vegetable sausage analogue. Typically, when combined with one or more of the preformed discontinuous components available for enclosing within the matrix, this continuous phase binder matrix comprises between about 30 and about 90 weight percent, based upon the total weight of the sausage formulation batter or of the formulation of the sausage analogue product. This quantity can be between about 30 and about 80 weight percent, preferably between about 30 and about 70 weight percent from in more preferably between about 35 and about 60 weight percent.

The powdered vegetable protein portion of this continuous phase composition is a high gelling soy protein isolate or concentrate. Such soy protein ingredients are well known in the art and are available from various sources, same originating from soy beans which are processed into an isolate or concentrate. Examples include SUPRO 545, SUPRO 500E, SUPRO EX32, and SUPRO EX33, of Protein Technologies International; PROFAM 981 of Archer Daniels Midland, and currently experimental organic protein concentrates of Iowa Soy.

This powdered vegetable protein will be present at between about 1 and about 15 weight percent, based upon the total weight of the batter formulation, preferably between about 2 and about 10 weight percent, most preferable between about 2 and about 5 weight percent. Water is added for hydration purposes at levels of between about 15 and about 50 weight percent of the batter formulation, the exact amount being variable depending upon the moisture level desired for the particular type of sausage product being prepared. A typical water level is between about 20 and about 40 weight percent of the batter formulation.

Edible binders included within the continuous phase are of the type generally known in the art. To date, success in formulating products according to the invention has included the use of an edible protein, namely egg protein. Egg white or egg albumin is especially preferred. The quantity of edible binder could vary between about 0.5 and about 10 weight percent, more typically between about 1 and about 8 weight percent, more preferably between about 1 and about 6 weight percent. When wheat gluten is added, a component such as vital wheat gluten will be at about 0.1 to about 5 weight percent, based upon the total weight of the batter formulation. A preferred range is between about 0.3 and about 3 weight percent.

When vegetable oil is included within the continuous phase composition, it could be present at as high as about 15 weight percent, preferably between about 5 and about 12 weight percent, based upon the total weight of the batter formulation. When provided, the vegetable oil provides some lubricity, often supplemented by lubricious properties of other components within the batter. Examples of vegetable oil in this regard are soy bean oil, canola oil, safflower oil, peanut oil, and the like. Typically, the oils will be hexane extracted or expeller pressed.

In a typical sausage formulation, seasonings and colors will be dispersed throughout the matrix. Typically, an efficient manner of dispersing the seasoning and color is by including such within the water added to the continuous phase binder matrix composition. Components such as seasoning and color will be present at levels of between about 1 and about 15 weight percent, based upon the total weight of the batter formulation, often between about 5 and about 12 weight percent. It will be appreciated that seasoning and color will vary depending upon the particular type or style of sausage being prepared.

Incorporated into this proteinaceous continuous phase, which sets up when the batter is subsequently heated, are components which enhance the texture of the product to make it more consistent with that of a meat sausage. These components also can provide flavor delivery system improvements which enhance the juiciness of the product and facilitate flavor distribution throughout the product, especially when chewed by the consumer. These components are dispersed within the continuous phase binder matrix. Generally speaking, each provides a discontinuous domain of particles within the continuous phase binder matrix. Such particle components can be one or more of three types, namely a structured filamentous protein component, a thermally preformed textured protein component, and a thermally structured carbohydrate gel crumble component.

The structured filamentous phase protein component is a fibrous textured vegetable, grain or other proteinaceous source. The proteinaceous source is formed into particles in the nature of fibers. For example, this can be accomplished by thermo-extrusion or coagulation of spun protein fibers in accordance with well-known processes. Preferred are particles or pieces of dehydrated spun protein in cylindrical or shredded shape. Preferred processing includes adding water and carrying out further size reduction by grinding, for example, so as to provide thin protein filaments. In the sausage matrix according to the invention, these filaments provide texture properties similar to those of connective tissue proteins such as collagen present in meat products. These impart unique sausage-like characteristics and mimic the small threads of connective tissue proteins which typically are visible when a meat sausage is bent slowly to the point of fracture and which contribute to the texture of meat sausages.

These structured filamentous protein components cooperate with the continuous phase binder matrix to provide a network of filaments set within the continues phase binder component. The structured filamentous protein component (as pre-hydrated with water) is present at about 3 to about 45 weight percent, based upon the total weight of the batter formulation. A preferred range is between about 5 and 25 weight percent of the batter formulation most preferably between about 10 and about 20 weight percent.

A suitable filamentous component is B-Tex, available from Protein Technologies International. Other filamentous proteins of this general type include SUPRO 200E of Protein Technologies International, Maicon Tex of Archer Daniels Midland, wheat protein of Midwest Grains, and fibers described or referenced in Hartman U.S. Pat. No. 4,818,558 of Worthington Foods and Dannert U.S. Pat. No. 3,794,731 of General Mills, Inc., each incorporated hereinto by reference. At times the filamentous protein components can be found as spun protein fibers which are coagulated in an acid bath and a spinneret is used to form fine fibers. Some of these, such as SUPRO 200E, is pre-hydrated with water. Others, such as B-Tex, typically are provided as dry protein and must be hydrated. A typical hydration ratio is one part of dry filamentous protein and 2.5 parts water.

Concerning the particular component which is the discontinuous phase structured proteinaceous gel phase, these are textured pieces sized to resemble a desired particular size of ground meat granules. This phase is comprised of proteinaceous materials derived from soy, wheat or other protein sources. Typically, these are thermally preformed pieces consisting of protein and water. The pieces are not themselves cohesive, but provide a discontinuous gel phase. In the finished sausage products, they provide resistance to chew and resemble the texture of ground meat such as beef, pork or chicken.

These structured proteinaceous discontinuous gel phase particles originate from textured protein available form sources such as Protein Technologies International, Inc. and Archer Daniels Midland Company. They can be made according to Parks U.S. Pat. No. 5,160,758, McMindes U.S. Pat. No. 5,433,969 or Payne U.S. Pat. No. 5,858,442, each incorporated by reference hereinto. These gel particles comprise between about 5 and about 50 weight percent of the batter formulation. Typically, the structured gel phase includes water. The protein component itself compromises between about 20 to 25 weight percent of the batter formulation. Water in this gel phase can comprise between about 5 and about 15 weight percent of the batter formulation. A preferred range for the structured proteinaceous gel phase is between about 20 and about 40 weight percent, more preferably between about 25 and 35 weight percent of the batter formulation.

Structured proteinaceous gel phase particles of this type include isolated soy protein products such as FXP C002, FXPM 281 and SUPRO 200G, as well as SUPRO 200F, SUPRO 200FC and SUPRO 200GC of Protein Technologies International. Often, these are provided as frozen, granular, isolated soy protein engineered from SUPRO® brand isolated soy protein. Such products deliver high quality protein, are low in fat, low in saturated fat, cholesterol-free and dairy-free. Other textured soy protein concentrates can be used by being hydrated with about 2 to 3 parts water and 1 part protein so as to be used in a manner similar to the PTI products. These are RESPONSE, of Centeral Soya, and Archer Daniels Midland concentrates. Other suitable sources are SUPRO® 545 and SUPRO 500E powdered isolated soy protein. These have high gel strength and good emulsion stability when combined with water as described in the Parks patent or the McMindes patent and sized by chopping or grinding.

Another particulate component is a starch granule or carbohydrate gel phase crumble component which comprises between about 5 and about 35 weight percent of the batter formulation, preferably between about 5 and about 20 weight percent, more preferably between about 5 and about 15 weight percent of the batter formulation. These particles are thermally structured gels which offer minimal resistance to bite force. Rather than being springy and resisting to bite, these carbohydrate gel phase particles break down rapidly during chewing and release their water readily. This rapid release of liquid provides the juiciness characteristic of a moist product and without the lubricious or slippery, non-liquid springy and chewy characteristics normally associated with adipose tissue.

A typical carbohydrate gel phase comprising this crumble component is a potato starch gel being high in water-holding capacity. Typically such products are bland in taste and white in color. Examples are PenGel 8 modified potato starch and PenGel N natural potato starch, each of Penford Food Ingredients Co. Products such as these have high moisture levels, on the order of about 75 to 80 weight percent of the gel. In making the bulk gel, a slurry of water and starch is heat processed to achieve gellation by a heat exchange mechanism, such as within an extruder. They can be made of potato starch, tapioca starch, corn starch and the like. They can be made in accordance with Share U.S. Pat. No. 5,603,976, incorporated by reference hereinto.

In preparing the carbohydrate gel phase particles according to the invention, some available thermally structured gels are suitably presized. Others will be ground. The presize or grind size should not be too fine. Adequate particle sizing is desired in order to impart the important rapid breakdown and liquid release during chewing. Typically, the particle size should be at least about 4 mm. A typical upper limit is in the order of about 16 mm. A suitable preferred range is between about 4 mm and about 12 mm. Preferably, the particle size is between about 4 mm and about 8 mm. A suitable range is between about 3/16 inch and about 5/16 inch.

In addition to the texture property of this ground component, it provides a visual benefit to enhance resemblance to typical course ground sausage products such as Bratwurst, Italian Sausage or Kielbasa. It has been found that providing this carbohydrate gel phase particle component results in sausage analogues perceived as juicier and as providing a faster and greater delivery of flavor than similar analogues omitting this component. The gel phase crumbles of this component readily break down upon being subjected to the mechanical action of chewing, resulting in liquid release from the crumbles. These crumbles are not stiff and have a consistency which resembles mashed potatoes.

Concerning the process by which sausages according to the invention are prepared, the batter is first combined together and mixed. In general terms, the batter can be processed within equipment, molds, casings and other means used in the sausage making industry, including those used in the preparation of frankfurters. For example, when casings are used they may be made of cellulose, collagen, or various polymers or plastics.

Once the batter is positioned within a desired suitable forming enclosure, the batter mixture is heat processed until the internal temperature of the product reaches a minimum of 185° F. (85° C.). It is preferred that the product be held at this temperature for a minimum of 15 minutes to allow the continuous proteinaceous gel phase to coagulate. It will be appreciated that these temperatures typically are higher than those practiced for meat products, particularly for forming meat batters into sausage products. These higher cooking temperatures can provide increased food safety over meat products by further reducing the amount of microorganisms which survive the heat process. Also typical of meat sausage manufacturing, the products can be subjected to natural smoking, or they can have artificial or liquid smoke incorporated or applied in order to impart smoke flavors to the finished sausage analogues.

Typical sausage processing steps generally follow. For example, following heat processing, the products are subjected to cooling in chilled water or with other cooling heat sinks or means. The formed products then are removed from any molding and/or casing, unless an encased product is being prepared. If desired, the products then can be frozen. Packaging can proceed by conventional methods including those incorporating vacuum conditions, modified atmosphere conditions, shrink wrapping, and other packaging means.

EXAMPLE 1

Sausage analogue products are prepared from batter having as its continuous phase a mixture of 3 pounds of powdered high gelling soy protein isolate (SUPRO 545 of Protein Technologies International), 4.5 pounds of powdered egg albumin, 7 pounds of canola oil, 0.5 pound of vital wheat gluten and 29.965 pounds of water for hydration. Also added are 10 pounds of seasoning for sausages and 0.035 pound of coloring agent.

To this is added 3 pounds of B-Tex structured filamentous dry protein from Protein Technologies International. This is hydrated to 10.5 pounds of B-Tex component. The B-Tex is ground to about ⅜ inch. Also added into this batter are 32 pounds of FXP C002 textured protein ground meat analogue from Protein Technologies International. Ten pounds of Pengel N thermally structured carbohydrate gel available from Penford Food Ingredients Co. are ground to one quarter inch. This ground thermally structured gel is added into the batter.

This batter is stuffed into casings. The stuffed products are heated until the internal temperature reaches at least 185° F. (85° C.). The sausages are held at this temperature for a minimum of 15 minutes so as to allow the continuous proteinaceous gel phase to coagulate. Next, the sausages are cooled in chilled water, frozen and packaged.

Evaluation of the sausages leads to the following observations. The sausages can be heated in the normal course to consumption temperatures. Breaking by hand reveals fibers of B-Tex giving the appearance of meat connective tissue, as well as small particles of starch gel. Chewing in the mouth gives a sausage texture feel. Included is the observation that granular components readily yield and release liquid, which facilitate delivery of flavor components to the taste buds of the consumer.

EXAMPLE 2

Sausage analogue products are prepared from batter having as its continuous phase a mixture including 1.9 pounds of powdered organic soy protein concentrate (experimental from Iowa Soy), 4.5 pounds of powdered egg albumin, 7 pounds of safflour oil, and 0.5 pound of wheat gluten. The composition also includes 43.25 pounds of water for hydration and 8 pounds of seasoning for sausages.

To this is added 2 pounds of B-Tex structured filamentous dry protein from Protein Technologies International. This is hydrated to 7 pounds of B-Tex component by including 5 pounds of water. The B-Tex is ground to about ⅜ inch. Also added into this batter to form the discontinuous phase are 11.9 pounds of RESPONSE 4401 and 6.3 pounds of RESPONSE 4412 textured soy concentrates from Central Soya. Eight pounds of Pengel N thermally structured carbohydrate gel available from Penford Food Ingredients Co. are ground to one quarter inch. This ground thermally structured gel is added into the batter.

This batter is stuffed into casings for heating until the internal temperature reaches at least 185° F. (85° C.). The sausages are held at this temperature for a minimum of 15 minutes so as to allow the continuous proteinaceous gel phase to coagulate. Next, the sausages are cooled in chilled water, frozen and packaged.

EXAMPLE 3

Sausage analogue products are prepared from batter having as its continuous phase a mixture including 2.4 pounds of powdered soy protein concentrate (PROMINE DS of Central Soya), 4.5 pounds of egg albumin, 7 pounds of canola oil, and 0.5 pound of wheat gluten. The batter also includes 40.9 pounds of water for hydration and 8 pounds of seasoning for sausages.

Hydrated B-Tex structured filamentous dry protein (7 pounds) from Protein Technologies International is added as 2 pounds of B-Tex component and 5 pounds of water. The B-Tex is ground to about ⅜ inch. Also added into this batter to form the discontinuous phase are 9.35 pounds of RESPONSE 4401 and 6 pounds of RESPONSE 4412 textured soy concentrates from Central Soya. Twelve pounds of Pengel N thermally structured carbohydrate gel available from Penford Food Ingredients Co. are ground to one quarter inch for adding into the batter.

This batter is stuffed into casings. Heating to an internal temperature of at least 185° F. (85° C.) for a minimum of 15 minutes is followed by cooling to finished sausage products.

EXAMPLE 4

A batter is prepared having as its continuous phase component a mixture including 4 pounds of powdered soy protein concentrate (PROMINE DS of Central Soya), 4.5 pounds of powdered egg albumin, 7 pounds of soybean oil, and 0.5 pound of vital wheat gluten. Also in the batter are 40.45 pounds of water for hydration and 8 pounds of seasoning. Also included are 7 pounds of hydrated J-330 structured filamentous dry protein from Protein Technologies International, as 2 pounds J-330 filamentous protein and 5 pounds of water component. This presized hydrated protein is added as is and results in increased batter viscosity which improves batter consistency during forming and filling. Also added into this batter to form the discontinuous phase are 6.85 pounds of RESPONSE 4401 and 5.7 pounds of RESPONSE 4412 textured soy concentrates from Central Soya. Sixteen pounds of Pengel N Penford Food Ingredients Co. thermally structured carbohydrate gel are ground to one quarter inch and added. This batter is stuffed into casings for heating to an internal temperature of at least 185° F. (85° C.) for a minimum of 15 minutes, followed by cooling.

It will be understood that the embodiments of the present invention which have been described are illustrative of some of the applications of the principles of the present invention. Numerous modifications may be made by those skilled in the art without departing from the true spirit and scope of the invention.

What is claimed is:

1. A cooked sausage analogue product, comprising:
    a continuous phase binder composition which includes at least powdered vegetable protein, an edible binder and water, said continuous phase binder composition making up between about 30 and about 80 weight percent of the formulation of the sausage analogue product;
    a structured filamentous protein component dispersed within said continuous phase binder composition and included within a binder matrix formed from the binder composition, said filamentous protein component, as prehydrated with water, making up between about 5 weight percent and about 25 weight percent of the formulation of the sausage analogue product, said structured filamentous protein component mimics meat connective tissue;
    one or more discontinuous vegetable protein components dispersed generally discontinuously within said matrix, said discontinuous vegetable protein making up between about 10 and about 50 weight percent of the formulation of the sausage analogue product; and
    said matrix had been formed upon heating of the binder composition containing the components while being in the shape of a sausage.

2. The product in accordance with claim 1, wherein said discontinuous vegetable protein includes a thermally preformed textured proteinaceous gel phase component dispersed within said continuous phase binder composition, said thermally preformed textured proteinaceous gel phase making up between about 5 and about 50 weight percent of the formulation of the sausage analogue product.

3. The product in accordance with claim 2, wherein said thermally preformed textured proteinaceous gel phase component is a meat analogue derived from soybean, wheat or other vegetable protein source.

4. The product in accordance with claim 1, wherein said discontinuous vegetable protein includes a thermally structured carbohydrate gel crumble component dispersed within said continuous phase binder composition, said carbohydrate gel crumble component making up between about 5 and about 35 weight percent of the formulation of the sausage analogue product.

5. The product in accordance with claim 4, wherein said thermally structured carbohydrate gel crumble has a particle size of between about 4 mm and about 8 mm.

6. The product in accordance with claim 1, wherein said discontinuous vegetable protein includes a thermally preformed textured proteinaceous gel phase component dispersed within said continuous phase binder composition, said thermally preformed textured proteinaceous gel phase making up between about 5 and about 50 weight percent of the formulation of the sausage analogue product, and wherein said discontinuous vegetable protein further includes a thermally structured carbohydrate gel crumble component dispersed within said continuous phase binder composition, said carbohydrate gel crumble component making up between about 5 and about 35 weight percent of the formulation of the sausage analogue product.

7. The product in accordance with claim 6, wherein said sausage analogue product is devoid of meat protein.

8. The product in accordance with claim 6, wherein said thermally structured carbohydrate gel crumble has a particle size of between about 4 mm and about 8 mm.

9. The product in accordance with claim 1, wherein said sausage analogue product is devoid of meat protein.

10. The product in accordance with claim 1, wherein said edible binder is an egg component.

11. The product in accordance with claim 1, wherein said discontinuous vegetable protein includes a thermally structured carbohydrate gel crumble made from a heat extruded slurry of water and starch, which crumble breaks down in response to consumption chewing and releases liquid from the starch crumble.

12. The product in accordance with claim 1, wherein said continuous phase binder composition further includes vegetable oil at between about 5 weight percent and about 10 weight percent, based upon the total weight of the formulation of the sausage analogue product.

13. The product in accordance with claim 1, wherein said continuous phase binder composition further includes between about 0.1 and about 5 weight percent wheat gluten, based upon the total weight of the formulation of the sausage analogue product.

14. The product in accordance with claim 1, wherein said powdered vegetable protein of the of the continuous phase binder composition is present at between about 1 and about 15 weight percent, based upon the total weight of the formulation of the sausage analogue product.

15. A cooked sausage analogue product, comprising:
a continuous phase binder composition which includes at least a powdered vegetable protein, an egg component and water, said continuous phase binder composition making up between about 30 and about 90 weight percent of the formulation of the sausage analogue product;
a structured filamentous protein component dispersed within said continuous phase binder composition, said filamentous protein component, as prehydrated with water, making up between about 5 weight percent and about 25 weight percent of the formulation of the sausage analogue product, said continuous phase binder composition forming a matrix including at least some of said filamentous protein component, said matrix having been formed by cooking into the shape of a sausage;
a thermally preformed textured proteinaceous gel phase component dispersed discontinuously within said continuous phase binder matrix, said thermally preformed textured proteinaceous gel phase component making up between about 5 weight percent and about 50 weight percent of the formulation of the sausage analogue product; and
a thermally structured carbohydrate gel crumble component dispersed within said continuous phase binder matrix, said carbohydrate gel crumble component making up between about 5 weight percent and about 20 weight percent of the formulation of the sausage analogue product.

16. The product in accordance with claim 15, wherein said cooked sausage analogue product is devoid of meat protein.

17. The product in accordance with claim 15, wherein said thermally structured carbohydrate gel crumble has a particle size of between about 4 mm and about 8 mm.

18. The product in accordance with claim 15, wherein said thermally structured carbohydrate gel crumble had been made from a heat extruded slurry of water and starch, which crumble breaks down in response to consumption chewing and releases liquid from the starch crumble.

19. The product in accordance with claim 15, wherein said continuous phase binder composition further includes vegetable oil at between about 5 weight percent and about 10 weight percent, based upon the total weight of the formulation of the sausage analogue product.

20. A cooked sausage analogue product, comprising:
a continuous phase binder composition which includes at least a powdered vegetable protein, an egg component and water, said continuous phase binder composition making up between about 30 and about 80 weight percent of the formulation of the sausage analogue product;
a structured filamentous protein component dispersed within said continuous phase binder composition, said filamentous protein component making up between about 3 weight percent and about 45 weight percent of the formulation of the sausage analogue product, said continuous phase binder composition forming a matrix including at least some of said filamentous protein component, said matrix having been formed by cooking into the shape of a sausage;
a thermally preformed textured proteinaceous gel phase component dispersed discontinuously within said continuous phase binder matrix, said thermally preformed textured proteinaceous gel phase component making up between about 20 weight percent and about 45 weight percent of the formulation of the sausage analogue product; and a thermally structured carbohydrate gel crumble component dispersed within said continuous phase binder matrix, said carbohydrate gel crumble component making up between about 5 weight percent and about 35 weight percent of the formulation of the sausage analogue product.

21. The sausage product in accordance with claim 20, wherein said product is devoid of meat.

22. The sausage product in accordance with claim 20, wherein said thermally structured carbohydrate gel crumble has a particle size between about 4 mm and about 8 mm.

23. The sausage product in accordance with claim 20, wherein said thermally structured carbohydrate gel crumble had been made from a heat extruded slurry of water and starch, which crumble breaks down in response to consumption chewing and releases liquid from the starch crumble.

* * * * *

UNITED STATES PATENT AND TRADEMARK OFFICE
CERTIFICATE OF CORRECTION

PATENT NO.    : 6,613,369 B2
DATED         : September 2, 2003
INVENTOR(S)   : David M. Gaeble and Julie A. Simonson It is certified that error appears in the above-identified patent and that said Letters Patent is hereby corrected as shown below:

Column 3,
Line 30-31, delete "preferable" insert -- preferably --.

Column 4,
Line 42, delete "continues" insert -- continuous -- .
Line 61, delete "is" insert -- are --.

Column 7,
Line 36, delete "safflour" insert -- safflower --.

Column 9,
Line 63, after "of the" delete "of the".

Signed and Sealed this

Thirteenth Day of July, 2004

JON W. DUDAS
*Acting Director of the United States Patent and Trademark Office*